United States Patent [19]
Moyer

[11] Patent Number: 5,695,430
[45] Date of Patent: Dec. 9, 1997

[54] HYBRID INTERNAL COMBUSTION ENGINE

[76] Inventor: David F. Moyer, 5 Weatherby Rd., Hanover, N.H. 03755-1923

[21] Appl. No.: 593,091

[22] Filed: Jan. 29, 1996

Related U.S. Application Data

[63] Continuation-in-part of Ser. No. 309,863, Sep. 21, 1994, Pat. No. 5,529,549.

[51] Int. Cl.$^6$ ........................................................... B60K 41/20
[52] U.S. Cl. ........................... 477/189; 477/186; 123/527
[58] Field of Search ........................... 477/189, 186, 477/187; 123/90.12, 90.14, 527

[56] References Cited

U.S. PATENT DOCUMENTS

| | | | |
|---|---|---|---|
| 3,817,228 | 6/1974 | Bywater | 123/90 |
| 4,036,323 | 7/1977 | Schmall | 477/187 X |
| 4,050,435 | 9/1977 | Fuller | 123/198 |
| 4,512,154 | 4/1985 | Ueno | 60/626 |
| 4,630,577 | 12/1986 | Cornacchia | 477/187 X |
| 5,163,389 | 11/1992 | Fujikawa | 123/90.16 |
| 5,193,495 | 3/1993 | Wood, III | 123/90.14 X |
| 5,233,950 | 8/1993 | Umemoto et al. | 123/90.14 |
| 5,255,641 | 10/1993 | Schechter | 123/90.12 X |
| 5,377,631 | 1/1995 | Schechter | 123/198 F |
| 5,408,974 | 4/1995 | Lipinski | 123/481 |
| 5,447,142 | 9/1995 | Bailey | 123/527 |
| 5,522,369 | 6/1996 | Povinger | 123/527 |
| 5,533,492 | 7/1996 | Willey et al. | 123/527 X |
| 5,537,824 | 7/1996 | Gustafson et al. | 123/527 X |
| 5,553,572 | 9/1996 | Ochiai | 123/90.14 |

*Primary Examiner*—Rodney H. Bonck
*Assistant Examiner*—Peter T. Kwon

[57] ABSTRACT

A method and apparatus for improving efficiency and reducing emissions of an internal combustion engine coupled to an inertial load. An apparatus is provided for controlling the energy exchange between engine and load so that the maximum conversion efficiency is obtained for both directions of energy flow. Valve controls make the engine a variable displacement expander or compressor so that kinetic energy received from the load by the engine may be stored as compressed air and returned to the load by the engine. These controls eliminate all fuel consumption and emissions when power is not required by the load, and utilize the stored energy in conventional engine operation.

10 Claims, 1 Drawing Sheet

HYBRID INTERNAL COMBUSTION ENGINE

CROSS REFERENCE

This application is a continuation in part which discloses and claims subject matter disclosed in my earlier pending application Ser. No. 08/309,863 filed Sep. 21, 1994, now U.S. Pat. No. 5,529,549.

FIELD OF THE INVENTION

The present invention relates to the field of internal combustion engines; more particularly to multi-functioned hybrid engines.

BACKGROUND OF THE INVENTION

This invention describes a method and apparatus for increasing the efficiency and reducing the undesirable emissions of an internal combustion engine. While the general principles and teachings hereinafter disclosed are applicable to all combustion engines, the invention is hereinafter described in detail in connection with its application to a reciprocating, fuel injected, spark ignited, internal combustion engine.

As used herein, the term "conventional engine" refers to a device which converts heat energy, released by the combustion of a fuel, into mechanical energy in a rotating output shaft of the engine. Also, the term "supercharged engine" refers to a conventional engine having the intake air pressurized above atmospheric pressure. Also, the term "disabled cylinder" is defined as having the intake and exhaust valves of a cylinder disabled so that they remain closed while the camshaft is rotating. Also, the term "air compressor" is defined as using the engine to take energy from the inertial load driven by the engine to compress air in the engine cylinders and then store it in a reservoir. Also, the term "air motor" is defined as powering the engine by the controlled release of compressed air into the engine cylinders.

In the United States, the law requires that passenger vehicles must be tested over an urban driving cycle while the fuel consumed and exhaust emissions generated are measured. This driving cycle has many periods of acceleration, deceleration and idle, with few periods of steady state speed, and is intended to reflect typical urban usage. During deceleration and idle operation it is difficult to control emissions in typical internal combustion engines—particularly throttled engines—because of the low manifold pressures at these times. Also, when the accelerator is released, fuel is consumed even though no energy is required from the engine. The emissions measured during this test must be less than those specified by law at the time of manufacture, and the fuel consumed is used in the determination of the manufacturer's Corporate Average Fuel Economy (CAFE) during that year.

DESCRIPTION OF PRIOR ART

Two of the principle methods of meeting these laws is to reduce the vehicle's size, weight, and aerodynamic drag; and also to utilize computer control of the engine operating variables as described in my earlier U.S. Pat. No. 3,969,614 which is incorporated herein by reference. A U.S. patent application Ser. No. 08/309,863 filed Sep. 21, 1994, to which the present improvements are a continuation in part, used a computer to control the engine valves and distribution valves to store air compressed by the engine during braking. It also used the valve control to disable cylinders during regular engine operations to provide a variable displacement engine in cylindrical increments. The present invention uses the same approach, but has a more flexible valve control to provide further improvements as described later.

Other proposals for accomplishing similar improvements are to be found in the prior art, but most rely on additional equipment not found on the present automobile. For example, Ueno in U.S. Pat. No. 4,512,154 utilizes the engine as an air compressor, but his valve control has an axially contoured camshaft which is translated axially to effect different valve actions. He does not manage the compression to provide controlled braking with changing storage pressures as the present invention does. Additionally, the patent shows complex piping of the exhaust gases, an extra exhaust valve for each cylinder and many other expensive additions to the engine system. The present invention uses a standard camshaft without translation and manages the valve actions to provide controlled braking with changing storage pressures.

Another proposal concerned with incremental disabling of the engine intake and exhaust valves during normal engine operation does away with the camshaft entirely. Schechter, in U.S. Pat. No. 5,377,631 describes a high pressure hydraulic system to operate the engine valves, where the oil must be forced rapidly through a series of passages for every stroke of the valve. The present invention has a hydraulic control which requires very small oil movement only when a change in the valve opening characteristic is required. Further, the power to move the valve comes from the conventional camshaft found in millions of automobile engines.

Another proposal for a cam motion control unit utilizes a structure similar to that of Schechter, but is interposed between the push rod and the cam in an engine with a standard camshaft providing the power to move the valve. U.S. Pat. No. 3,817,228 (Bywater) shows that although hydraulic power is not used to move the valve, it must be used in significant quantities on each valve stroke for the control unit—particularly during partial or full disablement of the valve. The present invention uses a spring which does not absorb any power to allow the free cam motion during disablement.

U.S. Pat. No. 4,050,435 (Fuller et al) shows a valve control for a cylinder cutout system which has a piston device inserted between the pushrod and rocker arm. When disabled, the pushrod (driven by the cam) pushes against a spring within the piston without overcoming the force of the valve spring. But the head of the pushrod must be a piston in an oil-filled cylinder for one of the functions (holding an exhaust valve inoperative in the open position). Therefore, oil must be forced in and out of the cylinder and full disablement at high camshaft speed is difficult to achieve. Partial disablement is not shown. The present invention, while controlled hydraulically and pushing a spring during disablement, needs only displace air in the part of its cylinder which is never pressurized and is substantially vented to atmosphere.

U.S. Pat. No. 5,163,389 (Fujikawa et al) is a valve lifter with hydraulic control of disablement and has the aforementioned problem of pumping oil continuously for each valve stroke during disablement.

U.S. Pat. No. 5,408,974 (Lipinski et al) is a cylinder mode selection system for variable displacement internal combustion engines. Its description of the prior art cites the one U.S. attempt at large scale production of a variable displacement engine with disabling valves and the problems associated with it. The method used by Lipinski is to have the computer control an electronic throttle operator to reduce the torque change during a disablement or enablement transition. The present invention eliminates the need for such a device since the valve control system provides a continuous change of torque during the operation of each cylinder and it is enabled or disabled at its zero torque condition.

SUMMARY OF THE INVENTION

The main object of this invention is to improve the efficiency and reduce the emissions of a conventional internal combustion engine while powering a vehicle in normal operating conditions. A further object is to utilize the energy now wasted as heat in braking a vehicle. A further object is to stop the fuel flow and emission generation while the accelerator pedal is released or the brake pedal is depressed. A further object is to utilize some of the energy now wasted as heat by the coolant radiator and the exhaust system. A further object is to increase each cylinder's thermal efficiency by controlling its power with the variable opening of its intake valve. A further object is to increase the engine efficiency by a sequential increase of the number of operating cylinders which gives it the advantages of a variable displacement engine. A further object is to provide a smooth transition of torque when an inoperative cylinder is made operative for increased engine power, or an operative cylinder is made inoperative for decreased engine power. A further object is to eliminate the conventional throttle and its pumping losses. A further object is to eliminate the external exhaust gas recirculation (EGR) valve. A further object is to increase engine power and efficiency by controlling valve overlap.

The method used by this invention to accomplish these objects is to operate the engine in one of five functional modes. Mode selection is accomplished by the controller in response to operator demand reflected in the accelerator and brake pedal positions. These functional modes are briefly described in the following five paragraphs:

Conventional Engine Function

The engine performs as a four cycle internal combustion engine. Filtered air is admitted unrestricted to the intake manifold (there is no throttle) and exhaust flows unrestricted from the exhaust manifold to the catalyst, muffler and tailpipe. The throttle function is performed by the controlled opening of the individual intake valves. One or more cylinders may be disabled, giving the performance of a variable displacement engine. The camshaft is designed with a valve overlap for maximum power. The valve control provides reduction of overlap for increased efficiency at low engine speeds. The control of the exhaust valve provides exhaust gas retainment for reduction of nitrogen oxides emissions and eliminates the need for an EGR valve system.

Supercharged Engine Function

This function is the same as the conventional function except that the intake manifold obtains its air from a pressure tank through a variable restriction in an intake distribution valve to control the amount of supercharging. This mode's time of operation is limited by the pressure tank capacities and is used primarily for accelerating the vehicle. Nitrogen oxides emissions are greatest with high combustion temperatures (when the thermal efficiency is also greatest) so that retained exhaust gas with little or no free oxygen is used as a thermal mass to reduce the temperature during combustion. To make up for the volume taken by the exhaust gas, the pressurized air obtained from previous braking is used during accelerations to produce the maximum power with minimum oxide emissions. The pressure of this stored air is usually much higher than atmospheric air, and the pressure drop when the air enters the cylinder causes a further temperature reduction.

Disabled Cylinder Function

Both the intake and exhaust valves of the cylinder are disabled and remain closed, all fuel flow is stopped, and the cylinder acts as an air spring, returning the energy on the expansion stroke which was absorbed on the compression stroke. There is very little engine drag when all the cylinders are simultaneously disabled.

Air Compressor Function

The intake valve is open while the cylinder volume is increasing, and gets filtered outside air through the intake distribution valve. The brake function is performed by the controlled opening of the exhaust valves while the cylinder volume is decreasing, coupled with the controlled opening of the intake valves. The compressed air from the cylinders is delivered to a pressure tank through a variable restriction in an exhaust distribution valve to control the amount of braking. This function may be compounded to store air at higher pressures by supplying compressed air from one tank through a variable restriction in the intake distribution valve to the intake manifold and storing the further compressed air in another tank.

Air Motor Function

The intake valve is open while the cylinder volume is increasing and receives compressed air from a pressure tank through a variable restriction set by the intake distribution valve to control the acceleration of the engine. The exhaust valve is open while the cylinder volume is decreasing, and delivers the exhaust air through the exhaust distribution valve to another pressure tank or the exhaust line. This mode's time of operation is limited by the intake pressure tank capacity and is used primarily for engine restarting (normally a few engine revolutions).

The apparatus of the invention includes a conventional internal combustion engine, a controller (preferably a programmable digital computer), electrically controlled engine valves, electrically controlled distribution valves, an electrically controlled storage valve, an electrically controlled fuel injector for each cylinder, and position sensors for: accelerator pedal, brake pedal, crankshaft, distribution valves, storage valve, and pressures within the air tanks.

The invention may be better understood by reference to the detailed description which follows and to the drawing.

METHOD OF OPERATION OF THE INVENTION

In the following description, the method and apparatus used to accomplish the objects of the invention are embodied in an engine control system as applied to a reciprocating, multicylinder, fuel injected, spark ignited internal combustion engine coupled to an inertial load. It should be understood, however, that the principles and approaches taken in connection with this particular type of engine are applicable to other types as well.

The camshaft is of ordinary design and the fuel injectors are electrically controlled. In addition, there are two electrically controlled distribution valves, one connected to each manifold. The intake distribution valve (IDV) connects its manifold with a variable restriction either to the intake air line or to a storage valve (SV). The exhaust distribution valve (EDV) connects its manifold with a variable restriction either to the exhaust line or to SV. SV either connects the #1 tank (T1) to IDV and the #2 tank (T2) to EDV or T1 to EDV and T2 to IDV. When control power is removed from SV, both tanks are shut off.

The opening amplitude and duration about the midpoint of each engine valve is controlled from 0 to 100% thus eliminating the conventional throttle and EGR valve. When the valve amplitude is 0%, the valve does not open. When the valve amplitude is controlled to 50%, the valve is closed during approximately the first and last quarter of its normal open cycle. If the intake and exhaust valves of a cylinder do not open, the cylinder is disabled, greatly reducing engine drag.

During the conventional mode of operation, the exhaust valve is opened an amount which will control valve overlap and exhaust gas retention, while the intake valve is opened an amount dependent upon the operator demand for power. The cylinders are enabled sequentially with increasing power demand: first one cylinder's exhaust valve is opened and its fuel injector activated while its intake valve is increasingly opened until it reaches fully open; then the second cylinder in like manner; until maximum power is reached with all cylinders having fully open intake valves and then the exhaust valves are set for maximum overlap. This method results in each cylinder reaching and maintaining its maximum thermal efficiency with no throttling losses (fully open valves) before the next cylinder begins to supply power. At any given power level, therefore, only one cylinder may not be operating at its maximum thermal efficiency. In addition, when a previously disabled cylinder is first enabled, its valve opening is small and hence the change in torque is minimal, making a smooth transition as cylinders are added for additional power. The same is true while subtracting cylinders for decreased power. This solves a drivability problem inherent in previous attempts to utilize valve disablement for increased part throttle efficiency. No matter how quickly or how slowly the accelerator pedal is depressed or released, the operator will not feel the transition.

When operating with any cylinders disabled, the active cylinders are rotated with the inactive cylinders so that all cylinders are kept at a uniform temperature. Whenever power is not required from the engine and the accelerator pedal is released, all fuel injection is stopped and all the valves are disabled. This allows the vehicle to coast with minimum engine drag. The brakes may be used to provide the engine drag without incurring any brake wear, since the braking merely stores compressed air and does not consume brake linings.

The valve control is also used to provide vehicle braking by stopping all fuel flow and using the engine as a compressor to absorb energy from the inertial load. Initially, all the intake and exhaust valves are fully enabled and the EDV at the exhaust manifold outlet is closed, resulting in a rapid increase in pressure in that manifold. When the desired braking force is achieved (usually within one engine revolution), the exhaust and intake valves' open amplitude and duration are decreased so that the energy absorbed remains at the desired value as the exhaust manifold pressure rises. When the exhaust manifold pressure is equal to or greater than a tank pressure, the EDV connects the exhaust manifold to that tank and regulates the pressure into it so as to produce the proper braking force while all the cylinders are enabled. When the tank pressure becomes so high that the efficiency drops excessively, the other pressure tank is connected to the intake manifold through the IDV, and the compression compounding begins. The higher intake mani-fold pressure delivers energy to the crankshaft on the intake stroke, so that the net brake energy is proportional to the difference between the intake manifold pressure and that of the exhaust manifold. When pressure in the tank connected to the IDV falls to a level insufficient to provide the desired brake torque, the IDV switches to the intake air line and the EDV switches to that tank with the reduced pressure while maintaining the desired torque. After its pressure is restored, the compounding resumes as before. Thus precise control of even light brake force can be maintained as the output tank pressure rises to values greater than that possible without compounding.

Since the vehicle may be braked to a stop without the engine idling, the compressed air accumulated during braking is used to restart the engine rapidly upon depression of the accelerator pedal. As the engine speed approaches zero, all the engine valves are enabled, and then when the accelerator pedal is depressed, the IDV connects the tank with the highest pressure to the intake manifold and the compressed air flows into the cylinders then in position for an intake stroke. This air pressure forces the piston down and the engine performs as an air motor until fuel is added (usually within 1 revolution) and supercharged or conventional engine operation begins.

As the stored air cools, some of its energy is lost and it becomes more dense. This is fine for supercharging, because the higher density of the cooled air contains more oxygen per unit volume and more fuel can be added so that engine power is increased. Additionally, the expansion of the high pressure stored air causes a significant temperature drop and increased density. However, when the air is used to restart the engine (as an airmotor) the reverse is true and the higher the temperature, the higher the pressure per unit volume, so that each expansion stroke delivers more power to the engine. Therefore, a further fuel saving is achieved by the utilization of waste heat from the coolant and exhaust systems while returning the stored compressed air for airmotor operation to the cylinders through a heat exchanger for the waste heat.

A controller is used to determine valve action during each revolution of the engine in response to signals of accelerator position, brake pedal position, engine speed, tank pressures and other operating conditions.

The controller, which is preferably a programmable digital computer, periodically receives and stores sensor values with which it calculates rate of change of the values with time (first derivative), and rate of rate of change of the values with time (second derivative) for each system condition measured by the sensor. Thus, the periodic measure of crankshaft position determines also its rotational speed and acceleration. With this information, the controller can send a signal to the engine valve regulator which enables a selected valve to the desired opening value at the appropriate time. The controller also has stored information of the engine characteristics, so that when operating information is compared to these characteristics, the optimum control values can be determined and sent as electrical control signals to fuel injectors, distribution valves, tank valve and engine valve regulator.

A regulator is used to individually adjust the oil level in each engine valve fulcrum by increasing or decreasing the pressure in separate lines to each fulcrum cylinder. A check valve action is provided for each line so that the level in the fulcrum cylinder does not change with a changing fulcrum spring force.

Figure 1:
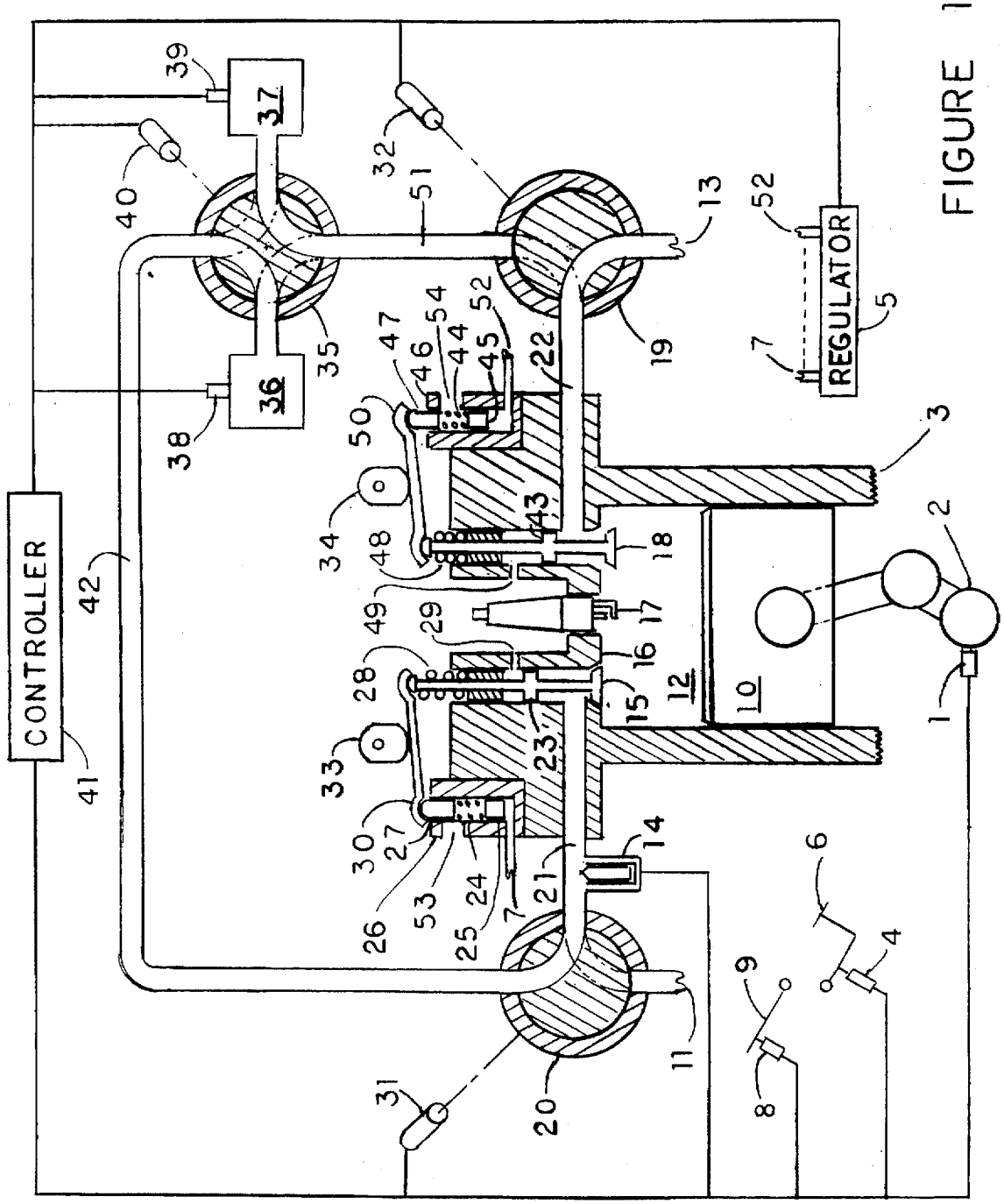
FIG. 1 is a schematic block diagram of the engine control system of a reciprocating, fuel injected, spark ignited, internal combustion engine.

REFERENCE NUMBERS LIST 1. crankshaft sensor
2. crankshaft
3. engine block
4. brake pedal sensor
5. engine valve regulator
6. brake pedal
7. intake valve oil lines
8. accelerator pedal sensor
9. accelerator pedal
10. piston
11. air supply line
12. engine cylinder
13. exhaust line
14. fuel injector
15. engine intake valve
16. cylinder head
17. spark plug
18. engine exhaust valve
19. exhaust distribution valve
20. intake distribution valve
21. intake manifold
22. exhaust manifold
23. intake valve disc
24. intake fulcrum spring
25. intake fulcrum lower piston
26. intake fulcrum cylinder
27. intake fulcrum upper piston
28. intake valve spring
29. intake valve vent
30. intake valve rocker arm
31. intake distribution valve actuator/sensor
32. exhaust distribution valve actuator/sensor
33. intake cam
34. exhaust cam
35. storage valve
36. #1 pressure tank
37. #2 pressure tank
38. #1 tank sensor
39. #2 tank sensor
40. storage valve actuator/sensor
41. system controller
42. intake pressure line
43. exhaust valve disc
44. exhaust fulcrum spring
45. exhaust fulcrum lower piston
46. exhaust fulcrum cylinder
47. exhaust fulcrum upper piston
48. exhaust valve spring
49. exhaust valve vent
50. exhaust valve rocker arm
51. exhaust pressure line
52. exhaust valve oil line
53. intake fulcrum vent
54. exhaust fulcrum vent

DETAILED DESCRIPTION OF THE INVENTION

With reference to the drawing, FIG. 1, there is shown a schematic block diagram of an engine control system embodying the method and apparatus of the invention. Shown is a cross section of one cylinder 12 of a vehicle engine with engine block 3 which may include a plurality of cylinders. A piston 10 is mounted for reciprocal motion within cylinder 12. Piston 10 is mechanically connected to a crankshaft 2 which transforms the reciprocal motion to rotary motion in the usual fashion. Also in the usual fashion, the crankshaft is connected to the wheels of the vehicle through a transmission and differential (not shown).

The inputs for a system controller 41 are sensors for: stored gas pressures 38 and 39, accelerator pedal position 8, brake pedal position 4, crankshaft position 1, and valve actuator/sensors 31, 32 and 40. The outputs from the controller go to engine valve regulator 5, fuel injector 14, and valve actuator/sensors 31, 32 and 40.

Filtered air supply line 11 is connected to the first port of rotary intake distribution valve 20 positioned by actuator/sensor 31. Pressure line 42 from pressure tank valve 35 is connected to the second port of valve 20. Intake manifold 21 is connected to the third port of valve 20. Actuator/sensor 31 positions valve 20 to connect with variable restriction line 11 to manifold 21 while sealing off line 42; or connects with variable restriction line 42 to manifold 21 while sealing off line 11; or seals off all three ports.

Exhaust line 13 is connected to the first port of rotary exhaust distribution valve 19 positioned by actuator/sensor 32. Pressure line 51 from valve 35 is connected to the second port of valve 19. Exhaust manifold 22 is connected to the third port of valve 19. Actuator/sensor 32 positions valve 19 to connect with variable restriction line 13 to manifold 22 while sealing off line 51, or connects with variable restriction line 51 to manifold 22 while sealing off line 13, or seals off all three ports.

Actuator/sensor 40 positions storage valve 35 to connect tank 36 to valve 20 and tank 37 to valve 19, or to connect tank 36 to valve 19 and tank 37 to valve 20, or when the control power is removed, valve 35 seals off all four ports.

Engine intake valve 15, housed within cylinder head 16, has disc 23 secured to its valve stem. Disc 23 offsets the pressure against the back of valve 15 body when there is any pressure in manifold 21 and prevents this pressure from opening valve 15. Intake valve vent 29 relieves the pressure on the opposite side of disc 23. In a like manner, engine exhaust valve 18 housed within cylinder head 16 has disc 43 secured to its valve stem. Disc 43 offsets the pressure against the back of valve 18 body when there is any pressure in manifold 22 and prevents this pressure from opening valve 18. Exhaust valve vent 49 relieves the pressure on the opposite side of disc 43.

Engine valves 15 and 18 are of the popper type and are urged to a closed position by springs 28 and 48. Valve fulcrums are cylinders 26 and 46 affixed to cylinder head 16 and contain upper pistons 27 and 47 on which the ends furthermost from the lower pistons are rounded to serve as fulcrum points, lower pistons 25 and 45, and intermediate springs 24 and 44. Rocker arms 30 and 50 are pushed-against cams 33 and 34 by their respective fulcrum springs intake fulcrum 26 is shown in the disabled position, and exhaust fulcrum 46 is shown in the enabled position. The enabled fulcrum's piston 45 is forced to its highest position due to the additional oil transmitted through oil line 52 from regulator 5. This compresses spring 44 so that its force is greater than that of spring 48 even when spring 48 is compressed by the action of cam 34 pushing against arm 50 and opening valve 18.

Conversely, in the disabled case, when the oil level in cylinder 26 is reduced, piston 25 is pushed by spring 24 to a lower position. In the case of fulcrum disablement, the oil level is low enough to allow piston 25 to reach its lowest position as shown for fulcrum 26. The force of spring 28 is then greater than that of spring 24 even when spring 24 is compressed by the action of cam 33 pushing against arm 30, and valve 15 remains closed. The movements of pistons 27 and 47 are facilitated by vents 53 and 54 in the upper part of cylinders 26 and 46 which permits air and leakage oil to move freely from and air into the space beneath pistons 27 and 47. Any intermediate position of the lower fulcrum piston will result in a proportionally delayed valve action with less than full opening and an early closing.

CONCLUSIONS, RAMIFICATIONS, AND SCOPE

It should be obvious to those skilled in the automotive arts that this invention will provide good drivability, better fuel economy, and less pollution than the present automobile engine. It should also be obvious that the expense of implementation will be low since most of the changes required for this invention are minor modifications of standard automotive parts. In particular, most tooling changes are minor, the additional computer program steps are simple and evident, and the additional parts required are inexpensive.

It should be noted that the engine valve control described in this specification could as well be an electric or hydraulic valve. This would, however, increase the implementation cost and perhaps reduce fuel economy because of the additional valve power needed.

While the description of the invention is a specific embodiment in a spark ignited engine, it is obvious that a diesel engine or any other internal combustion engine would obtain many of the benefits of this invention. Therefore, the scope of this invention should be determined by the claims which follow.

Based on the forgoing description of the invention, what is claimed is:

1. A method for operating a vehicle internal combustion engine system wherein driver demands for vehicle speed control are delivered to a controller as input signals and controller output signals are delivered to the engine controls, at least one said input signal being the position of the accelerator pedal and one said output signal controlling the engine valves, the method comprising steps of:

depressing said accelerator pedal causes said controller to enable an engine cylinder by opening the cylinder exhaust valve and by increasing the amplitude of the cylinder intake valve opening while supplying the engine intake manifold with atmospheric air containing fuel and connecting the exhaust manifold to the exhaust pipe, increasing depression of said pedal causes said controller to increase said intake valve opening amplitude of said enabled engine cylinder and when said amplitude is at 100%, then to enable another engine cylinder and to increase the opening of its intake valve, proceeding in this manner until all said engine cylinders are enabled with said intake valve amplitudes at 100%, decreasing depression of said pedal causes said controller to decrease said engine intake valve opening of the last enabled engine cylinder, when said engine intake valve is at 0% amplitude, then to disable said cylinder, then to begin closing the engine intake valve opening of another previously enabled engine cylinder, proceeding in this manner until all said intake valves are fully closed and their cylinders disabled with fuel flow discontinued, releasing of said pedal causes said controller to discontinue all fuel flow to said engine, and to disable all said cylinders.

2. A method as defined in claim 1, wherein depressing said pedal occurs when the engine speed is less than normal idling speed, then said controller closes off the atmospheric air supply to said intake manifold, connects gas pressure storage means to said intake manifold, regulates the pressurized air from said storage means, and controls said engine valves to drive said engine as an air motor until said engine speed is at least equal to said idling speed.

3. A method as defined in claim 1, wherein said controller is a digital computer and all said input signals and all said output signals are electrical.

4. A method as defined in claim 1, wherein said driver demands are electrical signals from a brake pedal position indicator and said accelerator pedal position indicator.

5. A method as defined in claim 1, wherein said controller inputs further comprise:

engine crankshaft position, at least one distribution valve position, at least one stored compressed gas pressure, at least one storage valve position.

6. A method as defined in claim 1, wherein said engine system controls further comprise:

at least one engine valve regulator, at least one distribution valve, at least one fuel injector, at least one storage valve.

7. A method as defined in claim 1, wherein said valve openings are controlled to adjust the amount of valve overlap, to adjust the amount of exhaust gas retention, and to adjust enablement of said cylinders for temperature distribution among all said cylinders.

8. A method for operating a vehicle internal combustion engine system wherein driver demands for vehicle speed control are delivered to a controller as input signals and controller output signals are delivered to the engine controls, at least one said input signal being the position of the brake pedal and one said output signal controlling the engine valves, the method comprising steps of:

depressing said brake pedal causes said controller to discontinue all fuel flow to the engine, enable all engine valves and close the exhaust distribution valve until the exhaust manifold pressure rises to that required for the desired brake torque, thereafter bleeding surplus compressed gas from said manifold into a gas pressure storage means having a pressure equal to or lower than said manifold pressure while maintaining said brake torque, increasing depression of said pedal causes said controller to reclose said exhaust distribution valve until said exhaust manifold pressure rises to that required for the new desired brake torque, thereafter again bleeding said surplus compressed gas from said manifold into said storage means having a pressure equal to or lower than said manifold pressure while maintaining said new brake torque, decreasing depression of said pedal causes said controller to increase the bleeding of said surplus gas until said exhaust manifold pressure falls to that required for the new desired brake torque, thereafter adjusting said bleeding rate to maintain said new torque, releasing of said pedal causes said controller to disable all cylinders.

9. A method as defined in claim 8, wherein there is no said storage means having an equal or lower pressure, then said controller adjusts the opening amplitude and duration of the intake and exhaust valves of at least one said cylinder so that said torque requirement is met as said exhaust manifold pressure continues to increase.

10. A method as defined in claim 8, wherein high storage pressures are required, said controller closes off the atmospheric air supply to the intake manifold and connects said storage means having a pressure higher than atmospheric pressure to said intake manifold.

* * * * *